(12) United States Patent
Meyer et al.

(10) Patent No.: US 12,275,840 B2
(45) Date of Patent: Apr. 15, 2025

(54) COMPOSITE MATERIAL COMPRISING POLYBUTYLENE SUCCINATE AND POLY(BUTYLENE SUCCINATE-CO-ADIPATE), AND COMPOSTABLE ARTICLE CONTAINING SAID COMPOSITE MATERIAL

(71) Applicant: SPC Sunflower Plastic Compound GmbH, Garrel (DE)

(72) Inventors: Sebastian Meyer, Hemer (DE); Stephan Albers, Dinklage (DE)

(73) Assignee: SPC Sunflower Plastic Compound GmbH (DE)

( * ) Notice: Subject to any disclaimer, the term of this patent is extended or adjusted under 35 U.S.C. 154(b) by 720 days.

(21) Appl. No.: 17/600,936

(22) PCT Filed: Mar. 27, 2020

(86) PCT No.: PCT/EP2020/058724
§ 371 (c)(1),
(2) Date: Oct. 1, 2021

(87) PCT Pub. No.: WO2020/201094
PCT Pub. Date: Oct. 8, 2020

(65) Prior Publication Data
US 2022/0195180 A1 Jun. 23, 2022

(30) Foreign Application Priority Data
Apr. 4, 2019 (DE) .......................... 102019108905.0

(51) Int. Cl.
*C08L 67/02* (2006.01)
*B65D 65/46* (2006.01)
(Continued)

(52) U.S. Cl.
CPC ............ *C08L 67/02* (2013.01); *B65D 65/466* (2013.01); *B65D 85/8043* (2013.01);
(Continued)

(58) Field of Classification Search
CPC ............ C08L 67/02; C08L 1/02; C08K 3/013
See application file for complete search history.

(56) References Cited

U.S. PATENT DOCUMENTS

| 2012/0017387 A1 | 1/2012 | Huang et al. |
| 2016/0185955 A1 | 6/2016 | Chen et al. |
| 2019/0144664 A1 | 5/2019 | Meyer et al. |

FOREIGN PATENT DOCUMENTS

| CA | 3022181 A1 | 11/2017 |
| CN | 109070410 A | 12/2018 |

(Continued)

OTHER PUBLICATIONS

Jiang et al (Applied Plastics Engineering Handbook, Second Edition, 2017) Biodegradable and Biobased Polymers, Table 7.3, p. 136 (Year: 2017).*

(Continued)

*Primary Examiner* — Catherine S Branch
*Assistant Examiner* — Olga Lucia Donahue
(74) *Attorney, Agent, or Firm* — Lerner David LLP

(57) ABSTRACT

What are described are a polymer mixture or polymer blend comprising polybutylene succinate and polybutylene succinate-co-adipate, a composite material or compound comprising polybutylene succinate and polybutylene succinate-co-adipate and/or said polymer mixture or polymer blend and one or more filler constituents, an article and/or single-use article comprising or consisting of said composite material or compound, and processes for producing the aforementioned composite material or compound or the aforementioned article or single-use article. Also described (Continued)

are the use of the polymer mixture or polymer blend for production of said composite material or compound, and the use of the composite material or compound for production of an article or single-use article that is compostable in particular.

8 Claims, 1 Drawing Sheet

(51) Int. Cl.
    *B65D 85/804*     (2006.01)
    *B29C 45/00*     (2006.01)
    *B29C 48/00*     (2019.01)
    *B29C 48/08*     (2019.01)
    *B29C 51/00*     (2006.01)
    *B29K 67/00*     (2006.01)
    *B29K 105/00*     (2006.01)
    *B29L 31/00*     (2006.01)

(52) U.S. Cl.
    CPC ...... *B29C 45/0001* (2013.01); *B29C 48/0018* (2019.02); *B29C 48/022* (2019.02); *B29C 48/08* (2019.02); *B29C 51/002* (2013.01); *B29K 2067/00* (2013.01); *B29K 2105/0085* (2013.01); *B29K 2995/006* (2013.01); *B29L 2031/7174* (2013.01); *C08L 2201/06* (2013.01); *C08L 2205/025* (2013.01); *C08L 2205/03* (2013.01); *C08L 2205/16* (2013.01)

(56) References Cited

FOREIGN PATENT DOCUMENTS

| JP | 2004359939 A | 12/2004 |
|---|---|---|
| JP | 2007002011 A | 1/2007 |
| JP | 2007320290 A | 12/2007 |
| JP | 2013503921 A | 2/2013 |
| JP | 2013136781 A | 7/2013 |
| JP | 201821103 A | 2/2018 |
| WO | 2011026171 A1 | 3/2011 |

OTHER PUBLICATIONS

Relatore Prof et al. "Politecnico Di Torino Master of Science Thesis Polybutylene Succinate thermal and hydrolytic aging" (Oct. 1, 2017), Retrieved from the Internet: http://webthesis.biblio.polito.it/6676/1/tesi.pdf, XP055701390. 137 pgs.

International Search Report for PCT/EP2020/058724 dated Jun. 19, 2020. 4 pgs.

\* cited by examiner

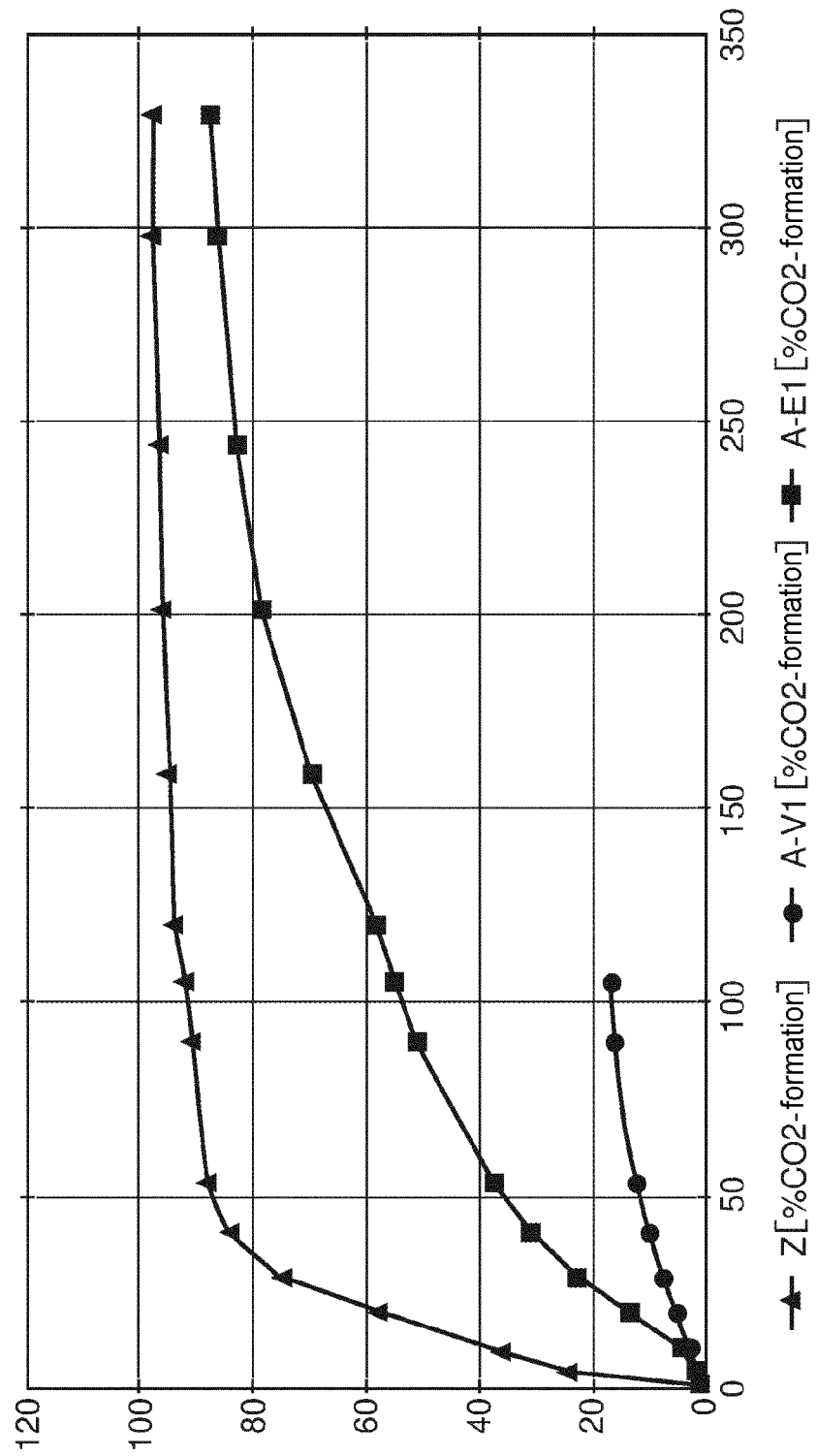

COMPOSITE MATERIAL COMPRISING POLYBUTYLENE SUCCINATE AND POLY(BUTYLENE SUCCINATE-CO-ADIPATE), AND COMPOSTABLE ARTICLE CONTAINING SAID COMPOSITE MATERIAL

CROSS-REFERENCE TO RELATED APPLICATIONS

The present application is a national phase entry under 35 U.S.C. § 371 of International Application No. PCT/EP2020/058724, filed on Mar. 27, 2020, which claims priority to German Patent Application No. 10-2019-108905.0, filed on Apr. 4, 2019, all of which are incorporated herein by reference.

The present invention relates to a polymer mixture or polymer blend comprising polybutylene succinate and polybutylene succinate-co-adipate, to a composite material or compound comprising polybutylene succinate and polybutylene succinate-co-adipate and/or the polymer mixture or polymer blend and one or more filler constituents, to an article and/or single-use article comprising or consisting of said composite material or compound, and to processes for producing the aforementioned composite material or compound or the aforementioned article or single-use article. The invention also relates to the use of the polymer mixture or polymer blend for production of said composite material or compound, and the use of the composite material or compound for production of an article or single-use article that is compostable in particular.

Polybutylene succinate is a plastic produced from butane-1,4-diol and succinic acid. Polybutylene succinate has extremely useful mechanical properties quite similar to polyethylene, for example a low modulus of elasticity and high toughness. It is also known that polybutylene succinate is biodegradable, but the conditions necessary for this purpose, for instance the temperatures required for substantial biodegradation within practicable periods of about three months, but at least of not more than one year, are not optimal for comprehensive utilization as a compostable material.

For some time, there have also been studies of a copolymer of polybutylene succinate for use as a compostable plastic: polybutylene succinate-co-adipate (also referred to as "poly(butylene succinate-co-adipate)" or "poly(1,4-butylene adipate-co-1,4-butylene succinate)"). In this copolymer of polybutylene succinate, there are monomer units formed from esters of succinic acid residues with butanediol residues, and monomer units formed from esters of adipic acid residues with butanediol residues. Polybutylene succinate-co-adipate has similar mechanical properties to polybutylene succinate, but lower tensile strength for example. On the other hand, it is known that polybutylene succinate-co-adipate has better biodegradability than polybutylene succinate (cf., for instance, M. Puchalski et al., Polymers 2018, 10, 251-262). More detailed information relating to structures and properties of polybutylene succinate and polybutylene succinate-co-adipate can also be found in the book "Synthetic Biodegradable Polymers", B. Rieger et al., Springer Science & Business Media, 2012.

There are already proposals in the prior art for the combination of polybutylene succinate or of polybutylene succinate-co-adipate with other polymeric compounds in order to modify their respective properties for particular applications. Known combinations are those, for example, with starch, polylactic acid (polylactide) or poly(butylene adipate-co-terephthalate).

Document WO 99/45067 A1 relates to a polylactic acid composition and a film produced therefrom.

It was a primary object of the present invention to provide a material that has excellent mechanical properties (in particular high toughness, strength and tensile strength) and good formability combined with particularly good biodegradability, even at comparatively low temperatures, for instance ≤50° C., and has excellent suitability for the production of compostable articles such as single-use articles, or of articles decomposable in the medium or long term. It was a further specific object of the present invention to provide processes for the production of such an aforementioned material and for articles obtainable therefrom, such as single-use articles.

It has now been found that, surprisingly, the primary object and further objects and/or partial objects of the present invention are achieved by a polymer mixture or polymer blend comprising
  polybutylene succinate
and
  polybutylene succinate-co-adipate.

In-house studies have shown that a polymer mixture or polymer blend comprising the two constituents polybutylene succinate and polybutylene succinate-co-adipate have excellent processibility to give compounds or composite materials having good formability, advantageously with specific variability of the properties of the polymer mixture or polymer blend by variation of the proportions of polybutylene succinate and polybutylene succinate-co-adipate in a manner of practical relevance. It was also found in in-house studies that a composite material or compound produced from a polymer mixture of the invention or polymer blend of the invention, or an article or single-use article produced therefrom, has significantly better biodegradability than a homopolymer of polybutylene succinate (or a composite material or compound produced from said homopolymer) considered by way of comparison.

The invention and combinations of preferred parameters, properties and/or constituents of the present invention that are preferred in accordance with the invention are defined in the appended claims. Preferred aspects of the present invention are also specified and defined in the description that follows and in the examples.

In the context of the present invention and as is customary in the specialist field, a polymer mixture or polymer blend is understood to mean a physical mixture of two or more (especially of two in the case of the present invention) base polymers. This preferably gives rise to a mixture in which the two base polymers are in molecular distribution or microscopic dispersion. Such a polymer mixture or such a polymer blend is therefore also referred to as "polymer alloy". Preferably, in such a polymer mixture or such a polymer blend, no new chemical bonds are formed between the base polymers involved. The properties of such a polymer mixture or such a polymer blend may nevertheless differ from the properties or the purely additive properties of the base polymers involved. The polymer mixture of the invention or polymer blend of the invention may be produced in a manner known per se to the person skilled in the art, for example by compounding the base polymers involved: polybutylene succinate and polybutylene succinate-co-adipate. In the present text, the expressions "polymer mixture" and "polymer blend" are used synonymously.

Preference is given to an above-described polymer mixture or polymer blend of the invention, wherein the mass ratio of the polybutylene succinate (also referred to hereinafter as "PBS") present in the polymer mixture or polymer blend to the polybutylene succinate-co-adipate (also referred to hereinafter as "PBSA") present in the polymer mixture or polymer blend is in the range from 10:90 to 90:10, preferably from 20:80 to 80:20, more preferably from 30:70 to 70:30, especially preferably from 40:60 to 60:40 and most preferably from 45:55 to 55:45. In a particularly preferred configuration of the present invention, the mass ratio of the PBS present in the polymer mixture or polymer blend to the PBSA present in the polymer mixture or polymer blend is 50:50 (i.e. 1:1).

By varying the mass ratios of the PBS present in the polymer mixture or polymer blend to the PBSA present in the polymer mixture or polymer blend, preferably within the above-specified ranges, it is possible to adjust the speed of biodegradation or speed of composting of the polymer mixture of the invention or of the polymer blend or of a composite material or compound comprising said polymer mixture or polymer blend (or of an article comprising the aforementioned materials), and to adjust it specifically to the respectively desired end use of the polymer mixture or polymer blend.

For example, a polymer mixture or polymer blend in which the mass ratio of the PBS present therein to the PBSA present therein is 30:70 is more quickly biodegraded compared to a polymer mixture or polymer blend in which the mass ratio of the PBS present therein to the PBSA present therein is 50:50, and so such a polymer mixture or such a polymer blend is suitable as starting material, in particular for the production of articles or single-use articles that are to decompose after a comparatively short period of time, for instance single-use plant pots.

By contrast, for example, a polymer mixture or polymer blend in which the mass ratio of the PBS present therein to the PBSA present therein is 70:30 is more slowly biodegraded compared to a polymer mixture or polymer blend in which the mass ratio of the PBS present therein to the PBSA present therein is 50:50, and so such a polymer mixture or such a polymer blend is suitable, in particular, as starting material for the production of articles or single-use articles that are to decompose after a comparatively long period of time, for instance tree guards.

Preference is therefore also given to a polymer mixture of the invention or a polymer blend of the invention or a polymer mixture or polymer blend of the invention described as preferred in this text, where the mass ratio of the polybutylene succinate present in the polymer mixture or polymer blend to the polybutylene succinate-co-adipate present in the polymer mixture or polymer blend is:

in the range from 10:90 to 40:60, preferably from 10:90 to 35:65 and more preferably from 20:80 to 35:65, or in the range from 90:10 to 60:40, preferably from 90:10 to 65:35 and more preferably from 80:20 to 65:35.

Preference is given to an above-described polymer mixture of the invention or a polymer blend (or a polymer mixture or polymer blend of the invention described as preferred in this text) wherein the polybutylene succinate comprises structural constituents (monomers) of the formula I

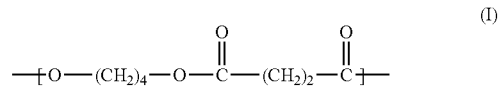

and/or (preferably "and")

the polybutylene succinate-co-adipate comprises structural constituents of the formula II

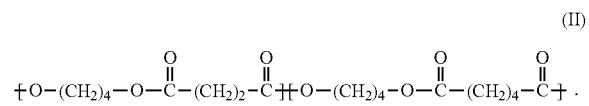

The structural constituents of the formula II are combinations of two comonomers (each between square brackets) based on (i) residues of butane-1,4-diol and succinic acid joined to one another by ester formation and (ii) residues of butane-1,4-diol and adipic acid joined to one another by ester formation. The comonomer based on residues of butane-1,4-diol and succinic acid joined to one another by ester formation corresponds to the above-specified structural constituent (monomer) of the formula (I).

The polybutylene succinate to be used in accordance with the invention and the polybutylene succinate-co-adipate to be used in accordance with the invention may each independently (depending on the preparation conditions employed in each case) be in a linear polymer structure or copolymer structure (unbranched) or in a branched polymer structure or copolymer structure.

Preference is also given to an above-described polymer mixture or polymer blend of the invention (or a polymer mixture or polymer blend of the invention described as preferred in this text) wherein the polybutylene succinate present in the polymer mixture or polymer blend and/or the polybutylene succinate-co-adipate present in the polymer mixture or polymer blend each independently have a weight-average molar mass $M_w$ in the range from 50 000 to 150 000, preferably in the range from 75 000 to 140 000, and/or a melt flow rate MFR in the range from 0.5 to 50 g/10 min, preferably from 1 to 40 g/10 min, determined to DIN EN ISO 1133-1:2011, Method A.

The aforementioned melt flow rate MFR is preferably determined in the context of the present invention at a temperature of 190° C. and a load of 2.16 kg. Preference is given to determining all melt flow rates MFR specified in the context of this invention according to DIN EN ISO 1133-1:2011, Method A, and at a temperature of 190° C. and a load of 2.16 kg.

The present invention also relates to a composite material or compound comprising as polymer constituent
  polybutylene succinate (as described or defined above) and polybutylene succinate-co-adipate (as described or defined above),
and/or (preferably "or")
  an above-described polymer mixture of the invention or a polymer blend (or a polymer mixture or polymer blend of the invention described as preferred in this text),
preferably in a total amount in the range from 30% to 75% by mass, more preferably from 35% to 70% by mass, based on the total mass of the composite material or compound, and
one or more organic and/or inorganic filler constituents, preferably in a total amount in the range from 5% to 70% by mass, more preferably from 10% to 55% by mass, based on the total mass of the composite material or compound.

With regard to preferred configurations of an aforementioned composite material or compound of the invention, the elucidations given above for the polymer mixture of the invention or the polymer blend, especially with regard to possible preferred embodiments and possible and preferred combinations, are correspondingly applicable (mutatis mutandis if appropriate), and vice versa.

The mass ratio of the polybutylene succinate present in the polymer constituent of the composite material or compound of the invention to the polybutylene succinate-co-adipate present in the polymer constituent of the composite material or compound of the invention is accordingly preferably likewise in the range from 10:90 to 90:10, more preferably from 20:80 to 80:20, especially preferably from 30:70 to 70:30, very especially preferably from 40:60 to 60:40 and even more preferably from 45:55 to 55:45.

In general, in the context of the present invention, the expression "a polybutylene succinate present in the polymer constituent of the composite material or compound of the invention" refers either to a polybutylene succinate present separately (individually) in the composite material or compound of the invention or to a polybutylene succinate present in the form of a polymer mixture or polymer blend in the composite material or compound of the invention (i.e. as a base polymer constituent of a polymer mixture or polymer blend of the invention). The same applies to the expression "a polybutylene succinate-co-adipate present in the polymer constituent of the composite material or compound of the invention".

In a preferred configuration of the present invention, the mass ratio of the polybutylene succinate present in the polymer constituent of the composite material or compound of the invention to the polybutylene succinate-co-adipate present in the polymer constituent of the composite material or compound of the invention is
in the range from 10:90 to 40:60, preferably from 10:90 to 35:65 and more preferably from 20:80 to 35:65,
or
in the range from 90:10 to 60:40, preferably from 90:10 to 65:35 and more preferably from 80:20 to 65:35.

As stated above, a composite material or compound of the invention in which the mass ratio of the polybutylene succinate present in the polymer constituent to the polybutylene succinate-co-adipate present in the polymer constituent is in the range from 10:90 to 40:60, preferably from 10:90 to 35:65 and especially preferably from 20:80 to 35:65 is preferred for production of comparatively rapidly biodegradable articles or single-use articles.

By contrast, a composite material or compound of the invention in which the mass ratio of the polybutylene succinate present in the polymer constituent to the polybutylene succinate-co-adipate present in the polymer constituent is in the range from 90:10 to 60:40, preferably from 90:10 to 65:35 and especially preferably from 80:20 to 65:35 is preferred for production of comparatively slowly biodegradable articles or single-use articles.

The weight-average molar mass $M_w$ of the polybutylene succinate present in the polymer constituent of the composite material or compound of the invention is preferably in the range from 50 000 to 150 000, preferably from 75 000 to 140 000. The weight-average molar mass $M_w$ of the polybutylene succinate-co-adipate present in the polymer constituent of the composite material or compound of the invention is likewise preferably in the range from 50 000 to 150 000, preferably in the range from 75 000 to 140 000.

The melt flow rate MFR of the polybutylene succinate present or to be used in the polymer constituent of the composite material or compound of the invention is preferably in the range from 0.5 to 50 g/10 min, more preferably from 1 to 40 g/10 min. The melt flow rate MFR of the polybutylene succinate-co-adipate present or to be used in the polymer constituent of the composite material or compound of the invention is likewise preferably in the range from 0.5 to 50 g/10 min, more preferably from 1 to 40 g/10 min.

In a further preferred configuration of the present invention, the polybutylene succinate present in the polymer constituent of the composite material or compound of the invention and/or the polybutylene succinate-co-adipate present in the polymer constituent of the composite material or compound of the invention each independently have a melt flow rate MFR
in the range from 0.5 to 3.5 g/10 min, preferably in the range from 1 to 3 g/10 min,
and/or (preferably "or")
in the range from >3.5 g/10 min to ≤12 g/10 min, preferably in the range from ≥4g/10 min to 10g/10 min,
and/or (preferably "or")
in the range from >12 g/10 min to ≤50 g/10 min, preferably in the range from ≥15 g/10 min to ≤35 g/10 min.

In-house studies have shown that the selection and combination of polybutylene succinate and/or of polybutylene succinate-co-adipate each having melt flow rates MFR within the above-specified ranges can specifically influence the processing properties of the composite material or compound of the invention:

For example, a composite material or compound of the invention that is of excellent suitability for processing by the thermoforming method, film extrusion method, blown film extrusion method and/or extrusion blow molding method is one in which the polybutylene succinate present in the polymer constituent thereof and/or (especially "and") the polybutylene succinate-co-adipate present in the polymer constituent thereof each independently have a melt flow rate MFR in the range from ≥0.5 to ≤3.5 g/10 min, preferably in the range from ≥1 to ≤3 g/10 min.

A composite material or compound of the invention in which the polybutylene succinate present in the polymer constituent thereof and/or (especially "and") the polybutylene succinate-co-adipate present in the polymer constituent thereof each independently have a melt flow rate MFR in the range from >3.5 g/10 min to ≤12 g/10 min, preferably in the range from ≥4 g/10 min to ≤10 g/10 min, is particularly suitable for processing by the foam extrusion method.

A composite material or compound of the invention in which the polybutylene succinate present in the polymer constituent thereof and/or (especially "and") the polybutylene succinate-co-adipate present in the polymer constituent thereof each independently have a melt flow rate MFR in the range from >12 g/10 min to ≤50 g/10 min, preferably in the range from ≥15 g/10 min to ≤35 g/10 min, is of excellent suitability for processing by the injection molding method. Likewise of excellent suitability for processing by the injection molding method is a composite material or compound of the invention in which the polybutylene succinate present in the polymer constituent thereof has a melt flow rate MFR in the range from >12 g/10 min to ≤50 g/10 min, preferably from ≥15 g/10 min to ≤35 g/10 min, and in which the polybutylene succinate-co-adipate present in the polymer constituent thereof has a melt flow rate MFR in the range from ≥0.5 g/10 min to ≤10 g/10 min, preferably from ≥1 g/10 min to ≤5 g/10 min. Also of excellent suitability for processing by the injection molding method is a composite material or compound of the invention in which the polybutylene succinate present in the polymer constituent thereof has a melt flow rate MFR in the range from ≥0.5 g/10 min to ≤10 g/10 min, preferably from ≥1 g/10 min to ≤5 g/10 min, and in which the polybutylene succinate-co-adipate present in the polymer constituent thereof has a melt flow rate MFR in the range from >12 g/10 min to ≤50 g/10 min, preferably from ≥15 g/10 min to ≤35 g/10 min.

It is possible with preference in the context of the present invention to control the processing properties in a composite material or compound of the invention (or in a polymer mixture of the invention or a polymer blend), or the material properties of an article or single-use article produced therefrom, by selecting, in the polymer constituent thereof:
  (i) a suitable or preferred mass ratio of the polybutylene succinate present therein to the polybutylene succinate-co-adipate present therein
and simultaneously
  (ii) polybutylene succinate and/or polybutylene succinate-co-adipate each with suitable or preferred melt flow rates MFR.

Preference is accordingly also given in many cases to an above-described composite material or compound of the invention (or a composite material or compound of the invention described as preferred in this text) wherein
  the mass ratio of the polybutylene succinate present in the polymer constituent of the composite material or compound to the polybutylene succinate-co-adipate present in the polymer constituent of the composite material or compound is in the range from 10:90 to 40:60, preferably from 10:90 to 35:65 and especially preferably from 20:80 to 35:65,
and
  the polybutylene succinate present in the polymer constituent of the composite material or compound and/or (preferably "and") the polybutylene succinate-co-adipate present in the polymer constituent of the composite material or compound each independently have a melt flow rate MFR in the range from ≥0.5 to ≤3.5 g/10 min, preferably in the range from ≥1 to ≤3 g/10 min.

Preference is likewise given in many cases to an above-described composite material or compound of the invention (or a composite material or compound of the invention described as preferred in this text) wherein
  the mass ratio of the polybutylene succinate present in the polymer constituent of the composite material or compound to the polybutylene succinate-co-adipate present in the polymer constituent of the composite material or compound is in the range from 90:10 to 60:40, preferably from 90:10 to 65:35 and especially preferably from 80:20 to 65:35,
and
  the polybutylene succinate present in the polymer constituent of the composite material or compound and/or (preferably "and") the polybutylene succinate-co-adipate present in the polymer constituent of the composite material or compound each independently have a melt flow rate MFR in the range from >12 g/10 min to ≤50 g/10 min, preferably in the range from ≥15 g/10 min to ≤35 g/10 min.

Organic filler constituents usable in accordance with the invention preferably include one or more, preferably particulate and/or fibrous, cellulose-containing materials. Inorganic filler constituents usable in accordance with the invention preferably include one or more particulate inorganic materials, preferably selected from the group consisting of calcium carbonate, clay minerals and silicates.

It has been found in in-house studies that the at least one, preferably particulate and/or fibrous, cellulose-containing material usable in accordance with the invention, as organic filler constituent (especially the cellulose-containing materials specified below as preferred), makes a particular contribution to the profile of mechanical properties of the composite material or compound of the invention, or of articles produced therefrom.

By varying the proportion by mass of the at least one, preferably particulate and/or fibrous, cellulose-containing material as organic filler constituent in the composite material or compound of the invention, it is possible to use the corresponding composite material or compound, for example, to produce comparatively thin-walled articles—for instance when a total amount of at least one cellulose-containing material in the range from 5% to 35% by mass, based on the total mass of the composite material or compound, is used. Alternatively, in many cases, it is also possible to produce comparatively thick-walled articles (for example boxes)—for instance when a total amount of at least one cellulose-containing material in the range from 25% to 50% by mass, based on the total mass of the composite material or compound, is used. By varying the content of at least one, preferably particulate and/or fibrous, cellulose-containing material usable in accordance with the invention in the composite material or compound of the invention, as organic filler constituent, it is therefore advantageously possible to control or adjust the mechanical properties of the composite material or compound of the invention, or the mechanical properties of an article of the invention produced from the composite material or compound of the invention.

It has also been found in in-house studies that the at least one particulate inorganic material usable in accordance with the invention, as inorganic filler constituent (especially the particulate inorganic materials specified below as preferred), makes a particular contribution to the ductility properties and/or to the barrier action against oxygen of the composite material or compound of the invention, or of articles produced therefrom. For instance, it has been found in in-house studies that an illustrative article of the invention consisting of a composite material or compound of the invention had an oxygen transmission rate of <0.01 $cm^3$/article*day*bar, while a corresponding article that did not contain any inorganic fillers had an oxygen transmission rate of 0.1 $cm^3$/article*day*bar.

For instance, a composite material or compound of the invention, or an article produced therefrom, having a low content of at least one particulate inorganic material—for instance containing a total amount of at least one particulate inorganic material in the range from 3% to 10% by mass, based on the total mass of the composite material or compound, has comparatively high ductility (plastic deformability), low brittleness and comparatively low barrier action against oxygen. By contrast, a composite material or compound of the invention, or an article produced therefrom, having a relatively high content of at least one particulate inorganic material—for instance containing a total amount of at least one particulate inorganic material in the range from 12.5% to 25% by mass, based on the total mass of the composite material or compound, has comparatively low ductility, comparatively high brittleness and comparatively high barrier action against oxygen. By varying the content of at least one particulate inorganic material usable in accordance with the invention in the composite material or compound of the invention, as inorganic filler constituent, it is therefore advantageously possible to control or adjust the ductility properties and/or barrier properties against oxygen of the composite material or compound of the invention, or the ductility properties and/or barrier properties against oxygen of an article or single-use article of the invention produced from the composite material or compound of the invention.

If single-use articles such as coffee capsules, for example, are to be produced from the composite material or compound of the invention it has been found to be advantageous to use a relatively high content (see above) of at least one particulate inorganic material (e.g. kaolin) in the composite material or compound of the invention because this makes such coffee capsules better suited to the intended use and means that they can be pierced better, for example.

Preference is given to an above-described composite material or compound of the invention (or a composite material or compound of the invention described as preferred in this text), wherein the one filler constituent or at least one of the multiple filler constituents
- comprises at least one, preferably particulate and/or fibrous, cellulose-containing material (preferably as organic filler constituent)

and/or
- comprises at least one particulate inorganic material (preferably as inorganic filler constituent) selected from the group consisting of calcium carbonate, clay minerals and silicates.

Preference is also given to an above-described composite material of the invention or a compound (or a composite material or compound of the invention described above or hereinafter as preferred) comprising
- C1) as polymer constituent
  polybutylene succinate and polybutylene succinate-co-adipate,
  and/or
  an above-described polymer mixture of the invention or a polymer blend (or a polymer mixture or polymer blend of the invention described as preferred in this text),
  preferably in a total amount in the range from 30% to 75% by mass, more preferably from 35% to 70% by mass, based on the total mass of the composite material or compound,
and
- C2) as first filler constituent (preferably as organic filler constituent) at least one, preferably particulate and/or fibrous, cellulose-containing material,
  preferably in a total amount in the range from 3% to 50% by mass, preferably from 3.5% to 47.5% by mass, more preferably from 5% to 45% by mass, based on the total mass of the composite material or compound.

Preference is also given to an above-described composite material of the invention or a compound (or a composite material or compound of the invention described above or hereinafter as preferred) wherein the preferably particulate and/or fibrous cellulose-containing material
- comprises one or more natural fibers and/or one or more regenerated cellulose fibers and/or
- is selected from the group consisting of cellulose, wood, flax, hemp, sunflower seed shells, bamboo, jute, kenaf, ramie, coconut fibers, fibers from stems of the gorse plant, fibers from stems of the hop plant, fibers from leaves and infructescences of bulrushes, and mixtures thereof,
- wherein the preferably particulate cellulose-containing material is preferably selected from the group consisting of wood, flax, hemp, sunflower seed shells (preferably ground sunflower seed shells), and mixtures thereof.

Particular preference is given to an above-described composite material of the invention or a compound (or a composite material or compound of the invention described above or hereinafter as preferred) wherein the preferably particulate cellulose-containing material comprises ground sunflower seed shells. Sunflower seed shells are obtained in large volumes as an industrial waste product, for example in food production. Use as organic filler constituent in the composite material or compound of the invention therefore combines the advantages that (i) an otherwise unutilized waste product is sent to an industrial use and that such a filler constituent is not just (ii) biodegradable, but the breakdown thereof additionally also gives rise to (iii) valuable biologically utilizable degradation products.

In the context of the present invention and as is customary in the specialist field, regenerated cellulose fibers are understood to mean those fibers that are produced from naturally occurring renewable cellulose-containing raw materials via chemical processes. These are in particular cellulose derivatives made from wood. Regenerated cellulose fibers in the context of the present invention preferably comprise the materials (or fibers of the materials) viscose, modal, lyocell and cupro, more preferably lyocell.

Viscose fibers refer to synthetic fibers (regenerated fibers) that have been produced industrially by means of the viscose process known per se, a widely employed wet spinning process. The starting raw material of the viscose process is cellulose, predominantly in the form of wood, in which the high-purity cellulose is extracted by various methods.

Modal fibers, like viscose fibers, likewise consist of 100 percent cellulose, but, unlike other regenerated fibers, are produced mainly from beechwood. The starting material is decorticated beechwood that has then been comminuted into pieces for separation of lignin. By modification of the production process, in the case of modal fibers, higher fiber strength and improved fiber properties are obtained than in the case of other cellulose fibers. Moreover, the modal fiber has relatively high moisture absorption and dries quickly.

Lyocell is an industrially produced regenerated cellulose fiber that consists of cellulose, is known per se, and is produced by the direct solvent process which is known per se. It is especially used for the production of textiles and nonwovens. Lyocell fibers have high dry and wet strength, are soft, and absorb moisture very well.

Cupro, also referred to as copper silk or copper fiber, is a textile fiber formed from regenerated cellulose. The properties of cupro are comparable to viscose. Cupro fibers are processed to textile linings in particular, since they are breathable, hygroscopic, and do not undergo static charging. Moreover, materials produced therefrom have a silky soft hand, and are smooth and shiny. Cupro is typically produced by the copper oxide-ammonia process (cuoxam process).

Preference is also further given to an above-described composite material of the invention or a compound (or a composite material or compound of the invention described as preferred in this text) comprising or additionally comprising C3) as second filler constituent at least one particulate inorganic material selected from the group consisting of calcium carbonate, clay minerals and silicates,
preferably in a total amount in the range from 3% to 30% by mass, preferably from 5% to 25% by mass, more preferably from 7.5% to 20% by mass, based on the total mass of the composite material,
and preferably
C4) further additives and/or auxiliaries, preferably selected from the group consisting of adhesion promoters (preferably maleic anhydride), waxes, lubricants, antioxidants and light stabilizers,
preferably in a total amount in the range from 0.1% to 10% by mass, preferably from 0.2% to 5% by mass, based on the total mass of the composite material.

It has further been found that particulate inorganic material, preferably having a high average aspect ratio of its particles, as second filler constituent imparts particularly good strength properties to the composite material or compound of the invention or the articles produced therefrom, such as single-use articles.

Preference is therefore also given to an above-described composite material of the invention or a compound or a composite material or compound of the invention described as preferred in this text, wherein the at least one particulate inorganic material and/or the second filler constituent C3) comprise(s) at least one particulate inorganic material
selected from the group consisting of calcium carbonate, talcum, talc, kaolin, iron mica, wollastonite mica, muscovite mica, phlogopite mica and mixtures thereof,
and preferably selected from the group consisting of talc, kaolin, iron mica, wollastonite mica, muscovite mica, phlogopite mica and mixtures thereof,
and/or
the particles of which have an average aspect ratio of ≥5:1, preferably of ≥7:1 and more preferably of ≥10:1.

In the context of the present invention (as is customary in the specialist field), the "aspect ratio" is preferably understood to mean the ratio between the length (height) and the (smallest) lateral extent of a particle in question.

In the context of the present invention (as is customary in the specialist field), the "average aspect ratio" is preferably understood to mean the average of the aspect ratios of a multitude of particles present in a sample. The average aspect ratio for the purposes of the present invention is preferably determined by dynamic image analysis of a multitude of particles, preferably with an automated particle analyzer, for example the Analysette 28 ImageSizer particle analyzer from Fritsch GmbH, Germany.

A particularly preferred configuration of the present invention also relates to an above-described composite material of the invention or a compound (or a composite material or compound of the invention described above or hereinafter as preferred) comprising
C1) as polymer constituent
polybutylene succinate and polybutylene succinate-co-adipate,
and/or
an above-described polymer mixture of the invention or a polymer blend (or a polymer mixture or polymer blend of the invention described as preferred in this text),
preferably in a total amount in the range from 30% to 75% by mass, more preferably from 35% to 70% by mass, based on the total mass of the composite material or compound,
where preferably the mass ratio of the polybutylene succinate present in the polymer mixture or polymer blend to the polybutylene succinate-co-adipate present in the polymer mixture or polymer blend is in the range from 10:90 to 90:10, preferably from 20:80 to 80:20, more preferably from 30:70 to 70:30, especially preferably from 40:60 to 60:40 and most preferably from 45:55 to 55:45;
C2) as first filler constituent (preferably as organic filler constituent) at least one, preferably particulate and/or fibrous, cellulose-containing material,
preferably selected from the group consisting of cellulose, wood, flax, hemp, sunflower seed shells, bamboo, jute, kenaf, ramie, coconut fibers, fibers from stems of the gorse plant, fibers from stems of the hop plant, fibers from leaves and infructescences of bulrushes, and mixtures thereof,
preferably in a total amount in the range from 3% to 50% by mass, preferably from 3.5% to 47.5% by mass, more preferably from 5% to 45% by mass, based on the total mass of the composite material or compound,
C3) preferably as second filler constituent at least one particulate inorganic material selected from the group consisting of calcium carbonate, clay minerals and silicates,
preferably in a total amount in the range from 3% to 30% by mass, preferably from 5% to 25% by mass, more preferably from 7.5% to 20% by mass, based on the total mass of the composite material,
and preferably
C4) further additives and/or auxiliaries, preferably selected from the group consisting of adhesion promoters (preferably maleic anhydride), waxes, lubricants, antioxidants and light stabilizers,
preferably in a total amount in the range from 0.1% to 10% by mass, preferably from 0.2% to 5% by mass, based on the total mass of the composite material.

The present invention also relates to an article and/or single-use article, preferably compostable, comprising or consisting of an above-described polymer mixture of the invention or a polymer blend (or of a polymer mixture or polymer blend of the invention described as preferred in this text) and/or comprising or consisting of an above-described composite material or compound of the invention (or a composite material or compound of the invention described as preferred in this text).

With regard to preferred configurations of an aforementioned article or single-use article of the invention, the elucidations given above for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

The above-specified articles and/or single-use articles—by virtue of their content of PBS and PBSA—generally have excellent biodegradability and preferably compostability according to the criteria of DIN EN 13432:2000-12.

Articles or single-use articles in the context of the present invention preferably includes food packaging, coffee capsules, disposable dishware or cutlery, plant pots, mulch films, tree guards, boxes and hygiene articles (e.g. diapers).

The present invention also further relates to the use of a polymer mixture of the invention or of a polymer blend (or of a polymer mixture or polymer blend of the invention described as preferred in this text) and/or of a composite material or compound of the invention (or of a composite material or compound of the invention described as preferred in this text) for or in the production of a preferably compostable article and/or single-use article.

With regard to preferred configurations of an aforementioned use of the invention for or in the production of an article or single-use article, the elucidations given above for the article or single-use article of the invention, for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

The present invention also relates to the use of a polymer mixture of the invention or of a polymer blend (or of a polymer mixture or polymer blend of the invention described as preferred in this text) for or in the production of a composite material or compound.

With regard to preferred configurations of an aforementioned use of the invention of a polymer mixture of the invention or of a polymer blend for or in the production of a composite material or compound, the elucidations given above for the use of the invention for or in the production of an article or single-use article, for the article or single-use article of the invention, for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

The present invention likewise relates to a process for producing a composite material or compound, preferably an above-described composite material or compound of the invention, comprising the steps of
V1) producing or providing
  a polymer mixture or a polymer blend comprising polybutylene succinate and polybutylene succinate-co-adipate, preferably an above-identified polymer mixture of the invention or a polymer blend (or a polymer mixture or polymer blend of the invention identified as preferred in this text),
  and/or (preferably "or")
  polybutylene succinate and/or (preferably "and") polybutylene succinate-co-adipate,
V2) producing or providing at least one, preferably particulate and/or fibrous, cellulose-containing material as first filler constituent, preferably as defined above or as specified as preferred,
V3) preferably producing or providing at least one particulate inorganic material as second filler constituent, preferably as defined above or as specified as preferred,
V4) combining
  the polymer mixture or polymer blend from step V1) and/or (preferably "or")
  the polybutylene succinate and/or (preferably "and") polybutylene succinate-co-adipate from step V1),
  with the at least one, preferably particulate and/or fibrous, cellulose-containing material from step V2) and preferably additionally with the at least one particulate inorganic material from step V3),
  preferably comprising a step of compounding, more preferably comprising a step of melt extrusion,
so as to result in the or a composite material or the or a compound.

With regard to preferred configurations of the process of the invention cited hereinabove for production of a composite material or compound, the elucidations given above for the inventive use of a polymer mixture of the invention or of a polymer blend for or in the production of a composite material or compound, the use of the invention for or in the production of an article or single-use article, for the article or single-use article of the invention, for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

In step V1) of the above-specified process of the invention for production of a composite material or compound, it is possible to produce or provide a polymer mixture or polymer blend of the invention (or a polymer mixture or polymer blend of the invention identified as preferred in this text), meaning that the production of the composite material or compound may proceed from said polymer mixture or polymer blend. It is likewise possible, in step V1) (or else in separate component steps of step V1) of the above-specified process of the invention to prepare or provide polybutylene succinate and polybutylene succinate-co-adipate separately as individual substances or polymer constituents, such that the two polymers (or the polymer and copolymer) are mixed with one another (and with the further constituents specified) only in step V4). But it is also possible in step V1) of the above-specified process of the invention to produce or provide a polymer mixture or polymer blend of the invention and additionally, as desired, either (i) to produce or provide polybutylene succinate separately as an individual substance or polymer constituent, or (ii) to produce or provide polybutylene succinate-co-adipate separately as an individual substance or polymer constituent, or (iii) to produce or provide both polybutylene succinate and polybutylene succinate-co-adipate separately as individual substances or polymer constituents. In this way, the polymer constituents produced or provided in step V1) are at least partly mixed with one another (and with the further constituents specified) only in step V4).

In step V4) of the above-specified process of the invention for production of a composite material or compound, preference is given to combining the above-specified constituents (polymer mixture or polymer blend from step V1) and/or polybutylene succinate and/or polybutylene succinate-co-adipate from step V1), at least one, preferably particulate and/or fibrous, cellulose-containing material from step V2) and preferably at least one particulate inorganic material from step V3)) additionally with further additives and/or auxiliaries, preferably selected from the group consisting of adhesion promoters (preferably maleic anhydride), waxes, lubricants, antioxidants and light stabilizers.

The present invention also further relates to a composite material or compound, preferably an above-described composite material or compound of the invention, produced or producible by an above-specified process of the invention.

With regard to preferred configurations of the composite material or compound cited hereinabove, produced or producible by an above-specified process of the invention, the elucidations given above for the process of the invention for production of a composite material or compound, the inventive use of a polymer mixture of the invention or of a polymer blend for or in the production of a composite material or compound, the use of the invention for or in the production of an article or single-use article, for the article or single-use article of the invention, for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

The present invention also further relates to a process for producing an article and/or single-use article, comprising the steps of V5) producing or providing a composite material or compound comprising, as polymer constituent,
polybutylene succinate and polybutylene succinate-co-adipate
and/or
an above-identified polymer mixture or polymer blend of the invention (or a polymer mixture or polymer blend of the invention identified as preferred in this text)
and
one or more organic and/or inorganic filler constituents,
where the producing or providing of a composite material or compound is preferably executed by
providing an above-described composite material or compound of the invention (or a composite material or compound of the invention described as preferred in this text)
and/or (preferably "or")
producing a composite material or compound by an above-described process of the invention (or by a process of the invention described as preferred in this text);
and
V6) forming the composite material or compound, preferably comprising at least one step selected from the group consisting of
extrusion, preferably comprising film extrusion, blown film extrusion, extrusion blow molding and foam extrusion;
injection molding,
deep drawing
and/or
thermoforming.

With regard to preferred configurations of the process of the invention for production of an article and/or single-use article cited hereinabove, the elucidations given above for the composite material or compound produced or producible by an above-specified process of the invention, the process of the invention for production of a composite material or compound, the inventive use of a polymer mixture of the invention or of a polymer blend for or in the production of a composite material or compound, the use of the invention for or in the production of an article or single-use article, for the article or single-use article of the invention, for the polymer mixture of the invention or the polymer blend and/or for the composite material or compound of the invention, especially with regard to (respectively) possible preferred embodiments and (respectively) possible and preferred combinations, are correspondingly applicable (mutatis mutandis if appropriate), and vice versa.

The present invention is elucidated in more detail hereinafter with reference to the figure and by examples. The examples that follow are intended to describe and explain the invention in more detail, without limiting its scope of protection.

FIGURE

FIG. 1: FIG. 1 shows a graph of the experimental results of the comparison of the composting speeds of inventive and noninventive articles and of cellulose (cf. example 9, table 1).

EXAMPLES

Example 1: Production of a Polymer Mixture of the Invention or of a Polymer Blend 5.41 kg of polybutylene succinate of the BioPS™ FZ 71 PM type (from PTT MCC Biochem Co. Ltd, MFR=22 g/10 min) is mixed with 5.41 kg of polybutylene succinate-co-adipate of the BioPS™ FD 92 PM type (from PTT MCC Biochem Co. Ltd, MFR=4 g/10 min) and compounded together in a twin-screw extruder at a temperature in the region of 140° C. in the intake and melting zone and of 180° C. downstream (although the melt temperature at the pelletizing die may be higher), so as to give a polymer mixture of the invention or a polymer blend of the invention.

Example 2: Production of a Composite Material or Compound of the Invention from a Polymer Mixture or Polymer Blend of the Invention A polymer mixture or polymer blend of the invention produced as described above (see example 1) is mixed with 6 kg of ground sunflower seed shells, 3 kg of pulverulent kaolin and 180 g of adhesion promoter based on maleic anhydride, and the commixed constituents are compounded/mixed in a twin-screw extruder at a temperature in the region of 140° C. in the intake and melting zone and 180° C. downstream (although the melt temperature at the pelletizing die may be higher), so as to give a composite material of the invention or a compound of the invention (referred to hereinafter as "VM-E1").

Example 3: Production of a Composite Material or Compound of the Invention by Separate Addition of Polybutylene Succinate and Polybutylene Succinate-Co-Adipate (1)

5.41 kg of polybutylene succinate of the BioPS™ FZ 71 PM type (see example 1 for details) is mixed with 5.41 kg of polybutylene succinate-co-adipate of the BioPS™ FD 92 PM type (see example 1 for details), 6 kg of ground sunflower seed shells, 3 kg of pulverulent kaolin and 180 g of adhesion promoter based on maleic anhydride, and the commixed constituents are compounded/mixed in a twin-screw extruder at a temperature in the region of 140° C. in the intake and melting zone and 180° C. downstream (although the melt temperature at the pelletizing die may be higher), so as to give a composite material of the invention or a compound of the invention (referred to hereinafter as "VM-E2").

Example 4: Production of a Composite Material or Compound of the Invention by Separate Addition of Polybutylene Succinate and Polybutylene Succinate-Co-Adipate (2)

3.25 kg of polybutylene succinate of the BioPS™ FZ 71 PM type (see example 1 for details) is mixed with 7.57 kg of polybutylene succinate-co-adipate of the BioPS™ FD 72 PM type (from PTT MCC Biochem Co. Ltd, MFR=22 g/10 min), 6 kg of ground sunflower seed shells, 3 kg of pulverulent kaolin and 180 g of adhesion promoter based on maleic anhydride, and the commixed constituents are compounded in a twin-screw extruder at a temperature in the region of 140° C. in the intake and melting zone and 180° C. downstream (although the melt temperature at the pelletizing die may be higher), so as to give a composite material of the invention or a compound of the invention (referred to hereinafter as "VM-E3").

Example 5: Production of a Noninventive Comparative Composite Material or Comparative Compound 10.82 kg of polybutylene succinate of the BioPS™ FZ 71 PM type (see example 1 for details) is mixed with 6 kg of ground sunflower seed shells, 3 kg of pulverulent kaolin and 180 g of adhesion promoter based on maleic anhydride, and the commixed constituents are compounded in a twin-screw extruder at a temperature in the region of 140° C. in the intake and melting zone and 180° C. downstream (although the melt temperature at the pelletizing die may be higher), so as to give a noninventive comparative composite material or comparative compound (referred to hereinafter as "VM-V1").

Example 6: Production of an Inventive Article (1)

2 kg of an inventive composite material or compound (VM-E2) produced according to the above example 3 is formed by injection molding at a temperature of 185 to 195° C. to give single-use plant pots (diameter: 12 cm, height: 12 cm, mass: 42 g, each per individual article/plant pot). What are obtained are single-use plant pots as articles or single-use articles of the invention (referred to hereinafter as "A-E1").

Example 7: Production of an Inventive Article (2)

2 kg of an inventive composite material or compound (VM-E3) produced according to the above example 4 is formed by injection molding at a temperature of 185 to 195° C. to give single-use plant pots (diameter: 12 cm, height: 12 cm, mass: 42 g, each per individual article/plant pot). What are obtained are single-use plant pots as articles or single-use articles of the invention.

Example 8: Production of a Noninventive Comparative Article 2 kg of a noninventive composite material or compound produced according to the above example 5 is formed by injection molding at a temperature of 185 to 195° C. to give single-use plant pots (diameter: 12 cm, height: 12 cm, mass: 42 g, each per individual article/plant pot). What are obtained are single-use plant pots as noninventive comparative article or comparative single-use article (referred to hereinafter as "A-V1").

Example 9: Comparison of Composting Speeds of Inventive and Noninventive Articles and of Cellulose An inventive single-use plant pot (A-E1, original mass: 42 g) produced according to the above example 6, a noninventive comparative single-use plant pot (A-V1, original mass: 42 g) produced according to the above example 8, and cellulose ("Z", comparison, powder as used for thin-layer chromatography) were finely ground and added at 28° C. to a simulated garden compost. The composting speeds were ascertained in accordance with DIN EN ISO 14855-1:2013-04, by means of analysis of the carbon dioxide ($CO_2$) released in the course of composting.

For this purpose, over an observation period, the amount of carbon dioxide released in the course of composting was determined in each case relative to the amount of carbon dioxide released in the breakdown of cellulose, and these were used to ascertain the relative degradation speed of the samples (A-E1 and A-V1) versus the degradation speed of cellulose (reference).

The values ascertained as specified above for the progression of composting of articles A-E1 and A-V1 and of cellulose were each reported as "% of the theoretically possible total amount of carbon dioxide", and reported as composting speeds in table 1 below against the number of days past in the respective measurements since the start of the experiment. A graph of the results is shown in FIG. 1.

Sampling for the noninventive comparative article A-V1 was stopped after 110 days since distinct stagnation in the formation of carbon dioxide resulting from biodegradation was observed.

After 117 days from the start of the experiment, fresh simulated garden compost was added to the experiments of article A-E1 and the cellulose reference in order to compensate for the declining microbial activity.

TABLE 1

Determination of composting speeds

| Days since start of experiment | Z [% $CO_2$ formation] | A-V1 [% $CO_2$ formation] | A-E1 [% $CO_2$ formation] |
|---|---|---|---|
| 0 | ./. | ./. | ./. |
| 5 | 23.8 | 1.5 | 1.9 |
| 10 | 35.3 | 2.6 | 4.4 |
| 20 | 57.9 | 5.5 | 13.8 |
| 30 | 75.8 | 8.1 | 22.9 |
| 40 | 84.0 | 10.5 | 30.5 |
| 53 | 88.1 | 12.7 | 36.9 |
| 90 | 91 | 16.4 | 50.9 |
| 105 | 92.1 | 16.7 | 54.5 |
| 120 | 93.7 | No data found | 58.1 |
| 159 | 94.9 | No data found | 69.8 |
| 202 | 96.0 | No data found | 78.4 |
| 245 | 96.9 | No data found | 83.0 |
| 299 | 97.7 | No data found | 86.1 |
| 330 | 97.8 | No data found | 87.7 |

It is apparent from the data in table 1 above that $CO_2$ formation as a result of biodegradation takes place much more slowly for the noninventive comparative article A-V1 than in the case of the inventive article A-E1 or in the case of cellulose. Even after 80 days from the start of the experiment, distinctly slowed biodegradation is observed for the noninventive comparative article A-V1. At the time of stopping of the experiment after 110 days (see also above), only about 16% by mass of the organic constituents (comprising the polybutylene succinate and the sunflower seed shells) of the noninventive comparative article A-V1 had indeed been biodegraded.

It is also apparent from the data in table 1 above that the loss of mass as a result of biodegradation does take place more slowly for the inventive article A-E1 than in the case of cellulose, but that, at the end of the experiment (after 365 days), the loss of mass as a result of biodegradation for the inventive article A-E1 was about 90% by mass of the organic constituents (comprising polybutylene succinate, polybutylene succinate-co-adipate and sunflower seed shells) of the inventive article A-E1 and hence reached >90% of the corresponding value for cellulose.

It can be concluded from this result that the increase in the composting speed and the increase in the proportion of composted mass for the inventive article A-E1 compared to the noninventive comparative article A-V1 is attributable to the additional content of polybutylene succinate-co-adipate in the inventive article A-E1, and that the extent of this increase in the composting speed and the extent of this increase in the proportion of composted mass was higher than would have been expected for a purely additive effect of the additional content of polybutylene succinate-co-adipate in the inventive article A-E1 (in addition to the polybutylene succinate used in the noninventive comparative article A-V1).

The invention claimed is:

1. A single-use article, comprising a composite material or compound comprising
    C1) a polymer constituent, consisting of
        polybutylene succinate and polybutylene succinate-co-adipate, and/or
        a polymer mixture or polymer blend, consisting of
        polybutylene succinate and
        polybutylene succinate-co-adipate,
    where the mass ratio of the polybutylene succinate present in the polymer constituent to the polybutylene succinate-co-adipate present in the polymer constituent is in the range from 10:90 to 90:10,
    in a total amount in the range from 30% to 75% by mass, based on the total mass of the composite material or compound,
    C2) as a first filler constituent at least one of a particulate cellulose-containing material or a fibrous cellulose-containing material,
    in a total amount in the range from 3% to 50% by mass, based on the total mass of the composite material or compound, and
    C3) as a second filler constituent at least one particulate inorganic material selected from the group consisting of calcium carbonate, clay minerals and silicates,
    in a total amount in the range from 12.5% to 25% by mass, based on the total mass of the composite material or compound.

2. The single use article of claim 1, wherein the single-use article is a coffee capsule.

3. The single use article of claim 1, wherein the mass ratio of the polybutylene succinate present in the polymer mixture or polymer blend to the polybutylene succinate-co-adipate present in the polymer mixture or polymer blend is in the range from 40:60 to 60:40.

4. The single use article of claim 1, wherein
the polybutylene succinate comprises structural constituents of the formula I

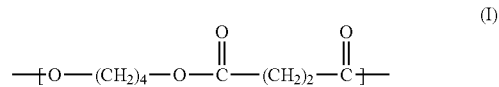

and/or
the polybutylene succinate-co-adipate comprises structural constituents of the formula II

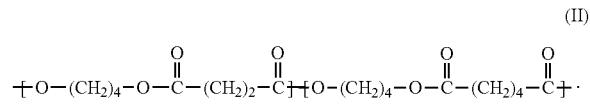

5. The single use article of claim 1, wherein the polybutylene succinate present in the polymer mixture or polymer blend and/or the polybutylene succinate-co-adipate present in the polymer mixture or polymer blend each independently have
    a weight-average molar mass Mw in the range from 50,000 to 150,000, and/or
    a melt flow rate MFR in the range from 0.5 g/10 min to 50 g/10 min, determined to DIN EN ISO 1133-1:2011, Method A.

6. The single use article of claim 1, wherein the polybutylene succinate present in the polymer mixture or polymer blend and/or the polybutylene succinate-co-adipate present in the polymer mixture or polymer blend each independently have
    a weight-average molar mass Mw in the range from 75,000 to 140,000, and/or
    a melt flow rate MFR in the range from 1 g/10 min to 40 g/10 min, determined to DIN EN ISO 1133-1:2011, Method A.

7. The single use article of claim 1, further comprising:
    C4) further additives and/or auxiliaries, in a total amount in the range from 0.1% to 10% by mass, based on the total mass of the composite material.

8. The single use article of claim 7, wherein the further additives and/or auxiliaries are selected from the group consisting of adhesion promoters, waxes, lubricants, antioxidants and light stabilizers.

* * * * *